United States Patent [19]

Shalit

[11] Patent Number: 4,939,581
[45] Date of Patent: Jul. 3, 1990

[54] METHOD AND SYSTEM IN VIDEO IMAGE HARD COPY REPRODUCTION

[76] Inventor: Hanoch Shalit, 86 Edwards St. - Apartment 2A, Roslyn, N.Y. 11577

[21] Appl. No.: 275,218

[22] Filed: Nov. 23, 1988

[51] Int. Cl.$^5$ .................... H04N 5/84; H04N 9/79
[52] U.S. Cl. .................... 358/244; 358/224; 358/332; 346/110 R
[58] Field of Search ............ 358/80, 332, 75, 37, 358/244, 244.1, 244.2; 355/67, 71, 77, 80; 346/110

[56] References Cited

U.S. PATENT DOCUMENTS

| | | | |
|---|---|---|---|
| 4,242,701 | 12/1980 | Levinson et al. | 358/75 |
| 4,263,001 | 4/1981 | Deutsch | 358/80 |
| 4,278,347 | 7/1981 | Okamoto | 358/24 X |
| 4,492,987 | 1/1985 | Burkhardt et al. | 358/332 |
| 4,520,403 | 5/1985 | Burkhardt et al. | 358/332 |
| 4,658,286 | 4/1987 | Schwartz et al. | 358/37 |
| 4,757,334 | 7/1988 | Volent | 358/244 |
| 4,794,460 | 12/1988 | Shiota | 358/244 |

OTHER PUBLICATIONS

"Film Selection Considerations for Video Photography" by Ronald P. Schwenker, *Proc. of SPIE-The International Society for Optical Engineering*, vol. 218, (Part I), Picture Archiving and Communication Systems (PACS) for Medical Applications, pp. 231-234 (1982).
"Sensitometry of Black-and-White Materials", Chapter 17, *The Theory of the Photographic Process*, Fourth Edition, edited by T. H. James, pp. 501-505.

Primary Examiner—Robert L. Richardson
Assistant Examiner—W. Daniel Swayze
Attorney, Agent, or Firm—Eliot S. Gerber

[57] ABSTRACT

A system and method for the accurate reproduction of the gray scale of a video monitor screen includes, in one embodiment, a video monitor and an electronic camera having an internal video receiver with a CRT screen. A gray scale test pattern is displayed on the video monitor screen and measured using a photometer. A gray scale test pattern is also displayed on the electronic camera CRT screen, and the electronic camera test pattern is photographed using film. The test pattern on the developed film is measured using a photoelectric densitometer and the results are entered into a computer memory look-up table and compared, by a tone-by-tone basis, with the ideal luminance value for each tone based on the photometer measurements. A set of corrections is obtained for each tone based on the photometer measurements of the gray scale and corrected to all tones available in the system. Those compensating corrections are used to adjust the luminance, on a pixel-by-pixel basis, of the video screen of the electronic camera, so that the screen is compensated to produce a gray scale in the developed film which reproduces the gray scale of the monitor screen.

17 Claims, 4 Drawing Sheets

METHOD AND SYSTEM IN VIDEO IMAGE HARD COPY REPRODUCTION

BACKGROUND OF THE INVENTION

1. Field of the Invention

The present invention relates to the compensation of a video image to provide an accurate black-and-white reproduction of the tonal luminance differences of the image.

2. Description of the Prior Art

At the present time, in a number of fields, a photograph is made from a video image, or the video image is part of the image reproduction chain, and it is desired that the photograph be an accurate reproduction of the tonal luminance differences of the image. For example, in the medical field a CAT X-ray scan, an ultrasonic scan, an NMR scan (nuclear magnetic resonance) or thermograph image is produced on a video monitor CRT (cathode ray tube) screen for immediate viewing by the physician. Simultaneously the same image is produced on another video CRT screen which is part of an electronic camera photographic system. That electronic camera photographic system includes the CRT tube, the video electronic system to produce the image on the CRT screen, optical lenses and equipment to focus the image and allow accurate exposure, and a photographic sensitive material to take a photograph of the image which is on the CRT screen.

The photograph is taken on photosensitive film that is developed using conventional black-and-white (or color) film development processes. The developed film may be directly viewed by the physician using a light box which illuminates the film. Such light boxes are often non-uniform in their illumination across the film and differ greatly in illumination from one box to another.

In the printing field it is sometimes desired to make an accurate printed picture from the image on a video monitor screen. For example, the screen may show a computer-generated image. That image is reproduced on a photosensitive material or directly on a printing plate to print a hard copy that should be similar in tone, luminance and color to the original object or scene.

It has been found that a photographic image reproduction may vary significantly from the original image on the video monitor screen. Some of the distortions are due to the inaccuracy of the CRT screen and video image reproduction process. That type of distortion has been recognized and compensation methods have been suggested, generally dealing with the problem as it affects an entire group of video monitors. Similarly, the distortions due to the camera have been recognized and treated, generally by improvements in the optics of the camera or overall corrections in video components (brightness, contrast, etc.). However, many of the distortions are not predictable and may vary from day to day and from one device to another.

Set forth below is a discussion of the problems most frequently encountered in producing an accurate picture in the video-to-photographic process as it relates to accurate tonal black-white reproduction. The contribution of each problem to the total final distortion of the picture can change in its characteristics periodically and is not predictable. One-day film development bath temperature may be incorrect and seriously distort the picture, and the next day it may still be incorrect but have only a minor adverse effect due to partial compensation distortions from other components in the system. In addition, most of the problem-causing effects are non-linear, so that complete compensating for them in a simple direct way is impossible.

The problems with the conventional system are explained in connection with FIG. 1, which is a block diagram of a conventional black-white photographic system. As shown in FIG. 1, the video image is produced by the video source 10, which may be a video camera, a computer graphics output, or a VCR. The video signal is viewed directly on the monitor CRT screen 11. The same video image is shown on an internal CRT screen 13 in the electronic camera 14. Generally the image on screen 13 is a negative image compared to the image on monitor screen 11. The camera 14 includes an optical system to take a still black-white or color photograph on the film 15 which is removed from the camera 14, after the series of photographs is taken and developed in a film processor 16. The film may itself be the final hard copy 17 or may be used to produce a black-white print using conventional print processing methods.

Each step of this conventional process gives rise to unpredictable distortions. The first set of distortions arises in the CRT device, and its screen 13, which is part of the electronic camera 14. The ratio between luminance values, i.e., the ratio between shades of gray, on the screen 13 may be inaccurate. For example, the CRT tube may be unevenly coated with phosphor, or may be aged or may be subject to flare. In addition, the relationship of the signal voltage applied to produce a certain brightness is not linear. Consequently, the negative image produced on the screen of the electronic camera may not be directly proportional, i.e., accurate, compared to the positive image on the monitor screen. A detailed description of the inaccuracy of an electronic camera due to CRT distortions is found in Schwenker, R. P., "Film Selection Considerations For Computed Tomography and Ultrasound Video Photography": *Proc. SPIE—Appl. of Optical Instrumentation In Medicine,* VII, 1979; 173, pgs. 75–80.

The electronic camera takes a picture using conventional black-white photo-sensitive film. The film density, in such film, does not accurately reproduce the differences in the gray scale because the film has a non-linear "characteristic curve" of density against log exposure. The exact shape of the curve varies from one manufacturer to another and even from one batch of film to another, see *The Theory of Photo Process,* T. H. James, pgs. 501–505, 4th Edition, Macmillan.

When the film is developed, distortions may arise from the variability of the process chemistry, variations in process temperature, variations in the film, and the non-linear characteristic of the photosensitive material of the film. In those cases in which the film is duplicated or made into a print, additional distortions may occur.

If the developed film is made into a print using a printer, still other distortions may arise from the dot size of the printing, the spread of the dots and the variable absorption of the ink into the paper due to various types and batches of paper. Also, the perception of the gray scale may differ depending on the type of printing process that is used.

After the film or other hard copy is produced, it is viewed under conditions which may detract from the accuracy of the gray scale tones. For example, the film may be placed on a light box whose intensity of illumination is greater at its center than at its sides. Another cause of viewing distortion is the "flare factor" in which flare (non-image light from outside the image) enters the optical viewing system and mainly affects the shadow areas.

The present invention is particularly directed to accurate reproduction of the luminance differences in value (differences in a gray scale) and absolute luminance on a black-white video screen. However, in its broader aspects, the invention is also applicable to the accurate reproduction of color images. The invention is directly applicable to color images in the sense that the video screen may be a color CRT screen and the invention will correct for gray scale distortions in reproducing the image on the color screen. In addition, the reproduction of color images has its own set of problems and distortions, aside from black-and-white tonal differences. These color distortions can also be corrected, and their correction will be discussed at the end of the detailed description.

These color and luminance distortions include (i) that the original color is not exactly matched to the phosphors on the CRT screen so that the color on the screen does not match the original color, (ii) that the color of the photo-sensitive dyes of the film do not match the color on the CRT screen and do not compensate for the color mis-match of the screen phosphors, (iii) that the color of the color photo-sensitive papers, dyes or printing inks do not match the color of the film. In addition, the chemistry for color films and color prints is more complex, and more temperature sensitive, than for black-white film and prints, so that variations in the chemistry or temperature cause distortion shifts in the color. A further problem with color, not found in black-white images, is that the perception of color of the object or video screen (by the human eye differs from the actual color on the film or print.

In U.S. Pat. No. 4,263,001 entitled "Apparatus and Method For Enhancement of Optical Images", in one embodiment, which is not claimed, a video camera is connected to an electronic image modification device which, in turn, is connected to a single frame storage, to prevent feedback, and a monitor CRT.

In U.S. Pat. Nos. 4,492,987 and 4,520,403, both entitled "Processor For Enhancing Video Signals For Photographic Reproduction", the screen of an electronic camera is electronically modified to enhance photographic reproduction. The entire screen is treated as a unit and its brightness or color is changed in accordance with the distortion introduced by a selected photographic film.

In U.S. Pat. No. 4,658,286 entitled "Method and Apparatus For Correcting Distortions In Reproducing Systems", a type of feedback system is described. In one embodiment three photocells look at a corner of the CRT screen having test colors and their outputs are compared to reference colors.

OBJECTIVES AND FEATURES OF THE INVENTION

It is an objective of the present invention to provide a more accurate black-white photographic image taken from the image on a video screen in which the photographic image more accurately maintains the relative and absolute (for luminance reproduction) tonal scale of gray tones.

It is a further objective of the present invention that the video image be compensated to obtain the accurate photographic image and that such compensation takes account of short term, for example, daily distortions, and long-term distortions and fixed sources of distortions.

It is a still further objective of the present invention that the operator is alerted to excessive deviations from a standard of tonal reproduction so that he may take immediate corrective action to restore the system so that it will produce reproductions with accurate tones.

It is a feature of the present invention to provide a method and system for the accurate tone reproduction of the luminance ratios in a black-white image. In one embodiment the original image may be viewed on a monitor CRT and it is also shown on the CRT screen of a video device which is part of an electronic camera. The video device has means to vary the luminance values (brightness-darkness) of each pixel on the camera CRT screen. A test image is shown on that CRT screen, the test image having areas differing in luminance, for example, a ten-segment gray scale. The test image is photographed by the camera using the same batch of film as will thereafter be used and the film is developed using the same chemicals and conditions as will thereafter be used. A photoelectric densitometer is used to test the densities of the test pattern on the developed image. The density values, in digital format, are entered into a computer having a look-up table whose entries are compared to table entries representing the ideal luminance for each tone. The look-up table provides a compensation value for each of the original camera or CRT tones.

When a certain pixel is to be activated on the CRT screen, its original brightness value is compensated for by the compensation value. Consequently, for example, an original lighter gray tone may be compensated to become brighter and an original darker gray tone may be compensated to become darker. In this way, in the same video frame, some pixels are made brighter and some pixels are made darker, in order to compensate for the distortions arising from the reproduction process.

SUMMARY OF THE INVENTION

The present invention uses the same components as a conventional system and, in addition, uses additional means to provide a rapid compensation so that the black-white tones (luminance differences on a video screen) are accurately reproduced.

The system, in one embodiment, uses a video source, such as a computer graphics output, VCR or video camera to produce an image on a CRT monitor. In one embodiment, the video source simultaneously also produces a reversed image on a CRT screen of an electronic camera. The electronic camera takes a photo-sensitive film picture of its CRT screen and the film is developed using conventional film processing.

The CRT video system of the electronic camera is connected to a computer having a look-up table memory and an image to be seen on the screen. The computer's image memory processes each frame of the video image on a pixel-by-pixel basis in digital form. A black-white gray scale test pattern is shown on the CRT screen of the electronic camera, having preferably at least 10 gray-scale areas. The test pattern is reproduced as a latent image on film in the electronic camera and developed into a negative image as hard copy. The test pattern is then sensed by a densitometer which provides a electrical signal corresponding to the gray-scale density of the test pattern on the developed film. The densitometer's output, in digital form, is entered into the computer. The computer, using its look-up table memory, will determine the required compensation, on a pixel-by-pixel basis. That compensation is applied to each video frame which passes through the computer's image memory.

The computer memory includes an ideal set of density value corresponding to the luminance values for each tone. Those ideal values are compared to the actual values, from the densitometer, to provide the required compensation. The compensation is non-linear so that making the entire video screen darker or brighter will not compensate for the distortions in the ratios between the tones. Instead, each tone requires its own compensation. Since an image is composed of different tones in different areas of the video screen, the luminance (brightness) value of each tiny area (pixel) is individually compensated to produce the tonal reproduction accurately.

Other embodiments of the present invention include other types of hard copy reproduction systems in place of an electronic camera. Such alternative systems include: (i) an xerography system in which a latent image corresponding to an image on a CRT video monitor is formed by a laser beam on a photo-sensitive drum; (ii) a laser-film system in which such a corresponding latent image is formed by a laser beam directly on photo-sensitive film; (iii) an ink-jet system in which the corresponding image, in this case a visible image, is formed by ink dots from an ink jet printer on paper; and (iv) a thermal printer system in which dyes or other imaging materials are transferred to a substrate, or activated in a substrate, to show a visible image, after processing.

BRIEF DESCRIPTION OF THE DRAWINGS

Other objectives and features of the present invention will be apparent from the following detailed description of the inventor's presently known best mode of practicing the invention, taken in conjunction with the accompanying drawings.

In the drawings.

DETAILED DESCRIPTION OF THE INVENTION

The present invention relates, in the below-described first embodiment, to the accurate reproduction of the black-white tone from the CRT screen of an electronic camera. The "tone" of an image is the ratio between its luminance values or brightness of the screen image. That tone ratio is sometimes called "luminance differences" or "shades of gray" or a "gray scale".

An accurate reproduction of the ratio of luminance values (gray scale) would occur when the ratio of density units on the film directly corresponds (linear relationship) to the gray scale on the screen. The density units on the film is a measure of the blackness of the film. Density is defined as the negative log transmission of the light which passes through the film or log reflectance of an opaque substrate. The "screen luminance" is the brightness of the CRT screen, or a portion of the screen, and is measured in terms of "log screen luminance" to directly correspond to density which is also a log function.

The CRT screen is divided into "pixels" with the pixels arranged in columns and rows. The number of pixels which is selected depends on the original image generator, i.e., medical scanner output, the screen size, the electronics of the CRT device (video electronics) and the video system which is used. In the United States there are various standards of video systems for medical purposes. For convenience, we may consider a system of 1000 horizontal lines and each line may be considered as 1000 pixels so the total number of pixels comprising the CRT screen is 1000×1000, or one million pixels. As explained below, using digital image processing device (memory store) each pixel value, it is possible to change the back-white value of each pixel. In the case of an 8-bit digital system, each pixel has a black-white gray scale of 256 values from 0 (blackest) to 255 (brightest), on the monitor screen.

Figure 2:
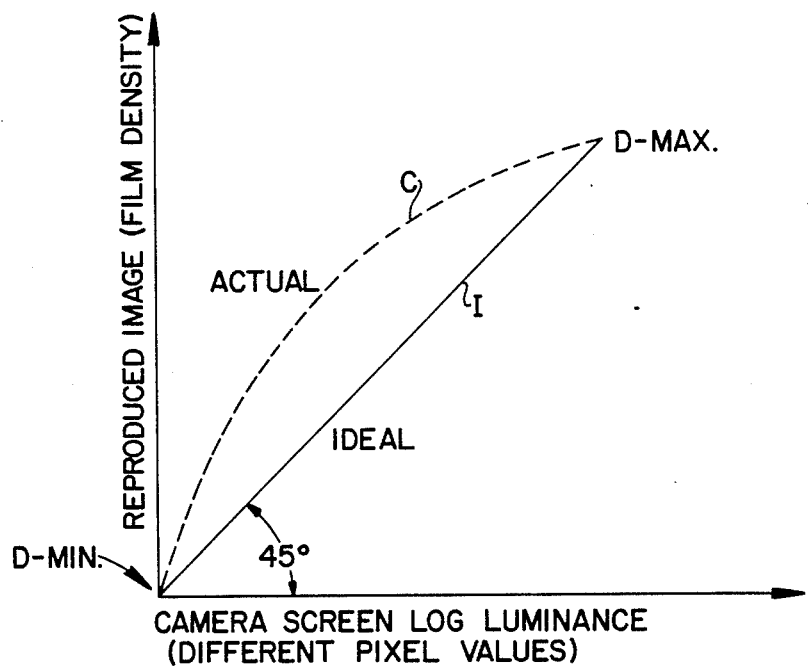
FIG. 2 is an X-Y graph showing the film density in the reproduced image plotted against camera video screen log luminance, i.e., different pixel values.

As shown in FIG. 2, it is relatively simple for the reproduced image to have the required minimum density (D min) and maximum density (D max). However, the gray scale on the film image is a non-linear curve C which differs from the ideal gray scale 1 which is linear. FIG. 2 plots the film density in the reproduced image against the CRT screen of the electronic camera in log luminance (brightness).

The present invention approaches the ideal gray scale of curve 1 by electronically adjusting the value of each pixel. If the film density is below the ideal curve, then the luminance of the pixel is raised, i.e., the brightness of the pixel is increased, so that the final density of the dot on the film corresponding to the corrected pixel on the electronic camera screen, after such compensation, is on the ideal gray scale line 1.

Figure 1:
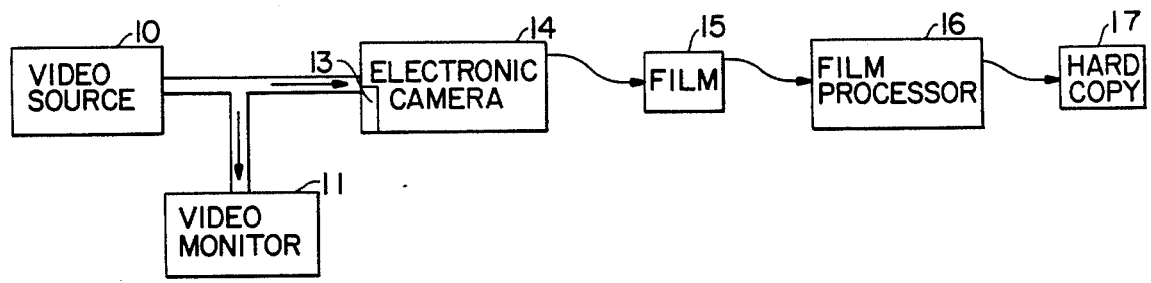
FIG. 1 is a block diagram of a prior art system to produce photographs of a video screen image.
Figure 3:
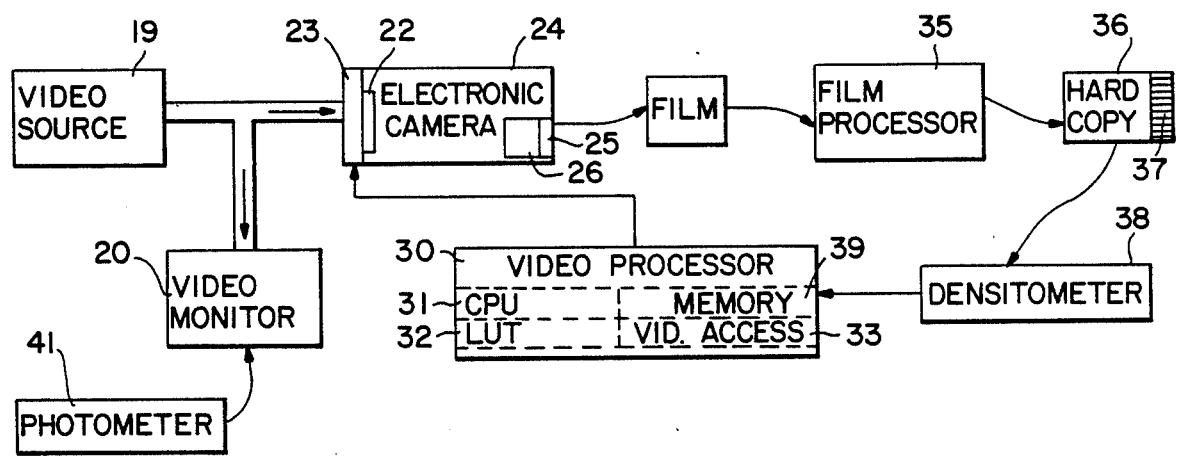
FIG. 3 is a block diagram of one embodiment of the system of the present invention.

As shown in FIG. 3, a block diagram of the first embodiment, a monitor video 20 includes a CRT screen. The monitor 20 shows an image which in this embodiment is a black-white image. Alternatively, the image may be a color image in which case correction of the tone on the reproduction will by itself, and without correction of color, greatly improve the accuracy of the color reproduction, for example, an 80% improvement.

The monitor 20 is preferably a high resolution video monitor having 1000 horizontal lines per video frame, each frame consisting of two interlaced fields each of 500 horizontal lines. There is no attempt, in this example, to enhance the image on the monitor 20; but only to enhance the reproduced hard-copy image so that it accurately matches the image on the monitor screen. However, the same method and system may be used to improve the image on another video screen (soft copy) so that it accurately reproduces the image on the monitor screen.

The same image which appears on the monitor screen also appears on the screen 22 of the video device 23, which is a part of the electronic camera 24. The electronic camera includes the optical system to focus the image from CRT screen 22 onto the photosensitive film 25 in its camera body 26. In a photographic negative system the film 25 is preferably a high resolution black-white negative film. The image on CRT screen 22 is preferably the inverse (inverted black-white) of the image on the screen of the monitor 20.

The electronic camera 24 is connected to the electronic processor 30 which is the computer means to calculate the correction values and to control the luminance of the CRT screen on a pixel-by-pixel basis. In this example, the CRT screen with its 500 horizontal lines per field (500 per frame and 2 fields each 1/60th second) is preferably divided so that each line has 500 pixels for a total of one million pixels per frame. Video images are conventionally generated in an interlaced fashion wherein every other line in the image frame is generated during one field interval and the alternative lines are generated during the next field interval.

The processor 30 includes a digital microcomputer, for example, intel, having a CPU (central processing unit) 31. The processor has three digital memories, which are preferably solid-state VLSI chips (Very Large Scale Integrated). The first memory 32 is a read-write LUT look-up table which includes, as one set of data held therein, the correct predetermined brightness (luminance) value that a pixel should receive to correctly portray each tone of the gray scale ("ideal value").

The second memory is a video access memory 33 which stores at least one field of the digital memory. Video access memories are characterized by a serial access port through which the video data can be input and output independently of other memory signaling and timing requirements. The present state of the art in these components is a 64k×4 device solid state integrated random access memory circuit ("RAM chip") with an internal 256×4 serial access buffer. Suitable devices are Hitachi (HM53461 or HM53462), Fujitsu (MB81461), and Mitsubishi (M5M4C264) for NTSC video signals.

The film 25 is developed, in conventional manner, in the film processor 35.

A densitometer 38, for example, "X-rite 301" model, having a digita output, is connected to the video processor 30. The densitometer measures the density values of the test pattern 37 on the developed film 36. The test pattern is preferably a band of 11 side-by-side panels of different predetermined tones of gray forming a gray scale. Alternatively, the gray scale may be obtained from a series, for example, 11, film exposures made in sequence. The density measured on developed film 36 appears in a digital electrical signal at the output of densitometer 38.

The digital values representing the actual densities of the gray scale of the test pattern are entered into the computer 30 which forms a new look-up table 32. For each actual density value of a gray tone there is, stored in the look-up table 32, an ideal value.

Figure 5:
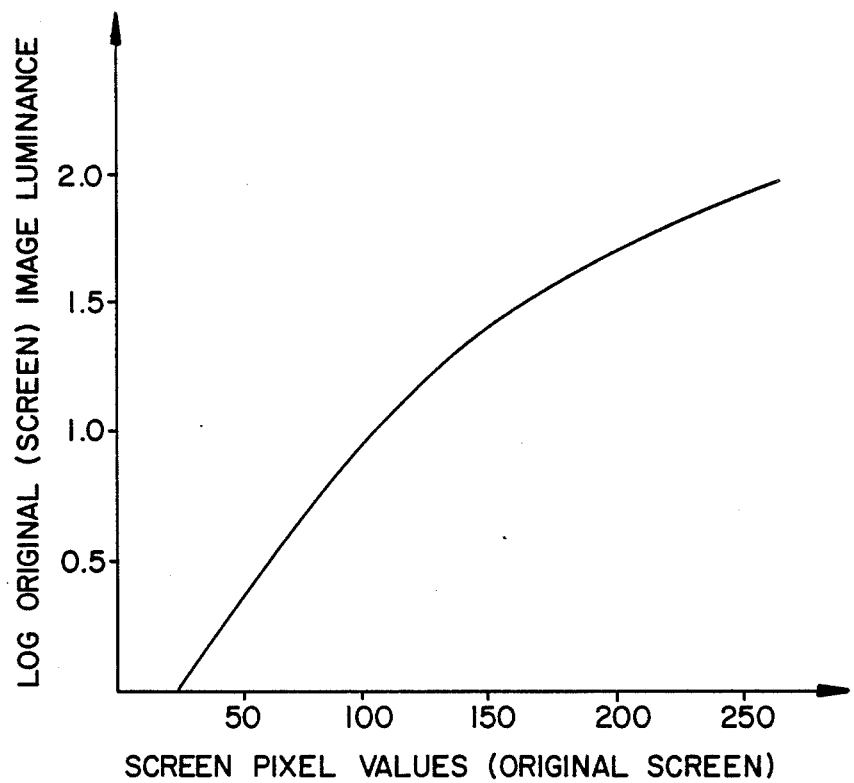
FIG. 5 is an X-Y graph in which log original screen image luminance on the Y axis is plotted against the screen pixel values (0–256) on the X axis.
Figure 6:
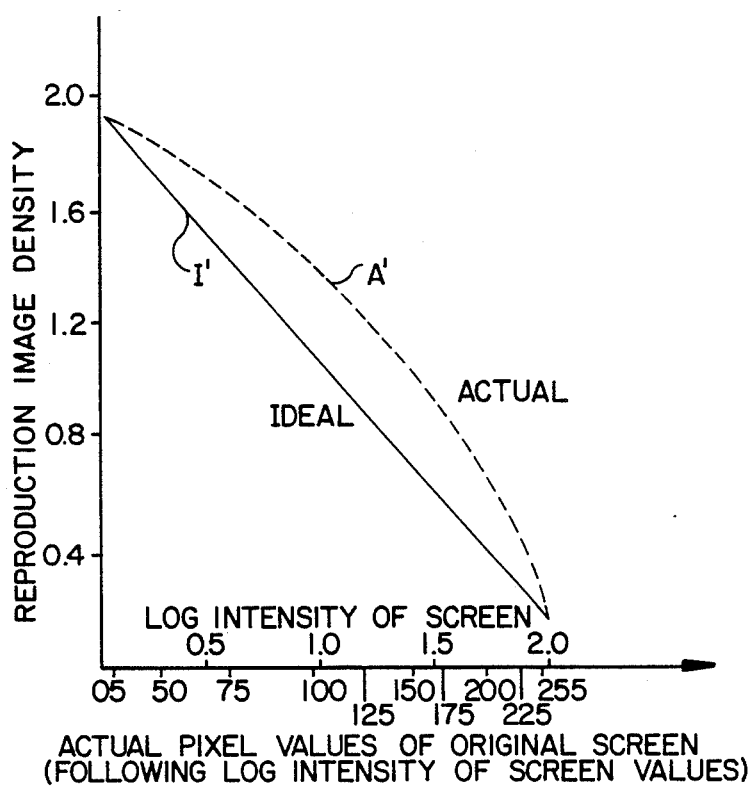
FIG. 6 is an X-Y graph in which the reproduced image density on the Y axis is plotted against the log original monitor video screen intensity (luminance) and screen pixel values.

The ideal value of the density representing the luminance of the monitor screen is obtained as follows: The luminance value of any pixel value, at any particular screen and ambient lighting condition cimbination) is found using a spot photometer 41, for example, the Minolta LS-100. A graph of pixel value Vs log original screen luminance is constructed (FIG. 5). The graph of FIG. 6 is then constructed based upon the actual luminance values of FIG. 5. In FIG. 6 the dual values of log intensity of screen and the actual pixel values of these screen luminances are marked simultaneously on the X-axis.

The density values of the film, i.e., the reproduction image density, as measured by a densitometer, are shown plotted on the Y-axis of FIG. 6. There is a linear relationship, in FIG. 6, shown by the ideal curve I, between density and log original screen luminance. The actual curve A, which are the densities as measured by the densitometer on the test pattern, is not linear.

Figure 7:
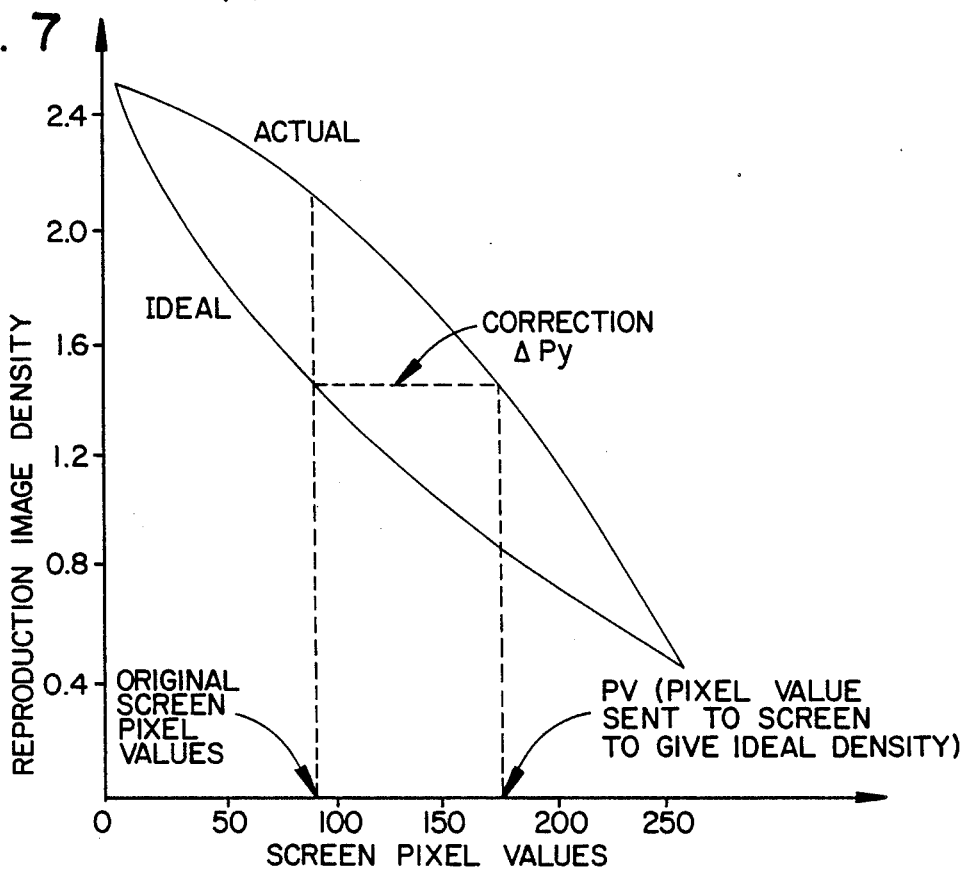
FIG. 7 is an X-Y graph in which the reproduced image density on the Y axis is plotted against the original screen pixel values on the X axis.

FIG. 7 is derived from FIG. 6. The various curves of the Figures are intended primarily as illustrations of the principles. In practice, the procedure is to use digital software (computer programs and memory) to establish the ideal pixel values for each gray scale tone.

The graph of FIG. 2 is the basis to construct the graph of FIG. 6 showing pixel values Vs (Ideal and Actual) densities.

The ideal pixel value is found on FIG. 7 as described above. Every screen pixel value is associated with a corresponding camera signal pixel value. The values of all the screen pixel values and their corresponding camera pixel values are entered in the look-up table (LUT) memory 32.

Using the LUT memory 32, each screen pixel value is changed to the corresponding camera pixel value. This correction yields an ideal density on the film which follows the ideal (or desired) tone reproduction curve.

An example is as follows:

1. Generate a gray scale test pattern of known pixel values of distinct steps (e.g., the SMPTE RP-133 of 11 steps of pixel values, in the form of side-by-side bands. The preferred pixel values are: 0, 25, 50, 75, 100, 125, 150, 175, 200, 225, 255.

2. Measure the screen luminance values on the screen of the video monitor 20 of these pixel values with the spot photometer. Then photograph this test pattern (screen image) with a camera calibrated to give the desired Dmin and Dmax of the reproduced image (i.e., a well calibrated camera-processor system). Measure the film densities on the developed film using the densitometer. Construct FIGS. 5, 6 and 7 in that order.

3. From FIG. 7 construct the LUT 32. The LUT 32 will feed their values to the computer program which programs CPU 31 so that each screen pixel value is changed to the appropriate camera pixel value. This yields the ideal density for the ideal tone reproduction.

The following table can be used for illustration:

|  |  |  |  |  | Column: | | |
|---|---|---|---|---|---|---|---|
|  |  |  |  |  | 6 | 7 | 8 |
|  |  |  |  |  | $\Delta D$ | Pv | $\Delta$ Pv |
| 1 | 2 | 3 |  |  | change | required | change |
| test | screen | luminance | 4 | 5 | in | (ideal) | in |
| pattern | pixel | value | resulting | ideal | densi- | (pixel) | pixel |
| step # | value | cd/m sq. | densities | densities | ties | values | values |
|  |  |  | Log |  |  |  |  |

| | | | | | 6 | 7 | 8 |
|---|---|---|---|---|---|---|---|
| 1 test pattern step # | 2 screen pixel value | 3 luminance value cd/m sq. | 4 resulting densities | 5 ideal densities | ΔD change in densities | Pv required (ideal) (pixel) values | ΔPv change in pixel values |
| 0 | 0 | 0.93–0.03 | 2.25 | 2.25 | 0.00 | 0 | 0 |
| 1 | 25 | 1.04–0.07 | 2.09 | 2.2 | 0.11 | 13 | −12 |
| 2 | 50 | 1.95–0.29 | 1.9 | 1.93 | 0.03 | 45 | −5 |
| 3 | 75 | 4.2–0.62 | 1.65 | 1.59 | −0.06 | 83 | 8 |
| 4 | 100 | 8.9–0.95 | 1.4 | 1.27 | −0.13 | 113 | 13 |
| 5 | 125 | 15.6–1.19 | 1.2 | 1.02 | −0.18 | 141 | 16 |
| 6 | 150 | 24.9–1.4 | 0.93 | 0.82 | −0.11 | 163 | 13 |
| 7 | 175 | 36.5–1.56 | 0.73 | 0.66 | −0.07 | 183 | 8 |
| 8 | 200 | 51.3–1.71 | 0.5 | 0.51 | 0.01 | 198 | −2 |
| 9 | 225 | 70.0–1.85 | 0.36 | 0.37 | 0.01 | 220 | −5 |
| 10 | 255 | 93.0–1.97 | 0.25 | 0.25 | 0.00 | 255 | 0 |
| | | | Values obtained from: | | | | |
| test pattern | test pattern | photometer | densitometer | FIG. 6 or equaton 1 | Col. 5 (−) Col. 4 | FIG. 2 or equation 2 | Col. 7 (−) Minus Col. 2 |

The following mathematical tools help in reducing most of the labor described above:

1. Instead of construction FIGS. 7 and 6, the ideal density is calculated as follows (to a close approximation):

Equation 1:

Ideal density=log (actual lumnance values)*[Dmax−Dmin/log luminance max.−log luminance min.]+Dmax−(Dmax−Dmin/Log luminance max.−log luminance min.)*log luminance min.

2. Instead of measuring the Ideal Pixel Value (Pv) for a particular density it is calculated as follows (to a close approximation):

Equation 2:

Ideal Pv=Pv of existing density+ΔPv when ΔPv=(1/local slope of ΔD/ΔPv at point of measurement)*ΔD 3. Instead of measuring all the values of the LUT 32 from FIG. 7 (or using all the calculation values for all possible densities) only the 11 values of the test pattern pixel values and corresponding Ideal and Actual Densities are fed into the computer program which is programmed to interpolate the intermediate values using (for example) polynomial calculations.

QUALITY ASSURANCE PROGRAM

Once the ideal pixel values are found and the corrections made the ideal pixel values are inserted into the signal going to the CRT screen 22, the ideal film densities are reached.

Any periodic change in the photographic characteristics of the photograhic system (film, processor, temperature, chemical activity etc.) will create a new distorted curve (in FIGS. 2, 4, 6 and 7) which will be different from the ideal curve prviously obtained.

The same method is used to compensate for the new distortion as with the original corrections. Preferably daily a new set of LUT for the new pixel values are constructed (as before) to yield the ideal tone reproduction of the screen image.

For example:

One assumes that the film processor 35 temperature has increased and the resulting reproduced film image has higher density values than required by the ideal tone reproduction relationship (FIG. 6).

In this example only columns 4, 6, 7, 8, in the above table should be modified:

Column 4: The new resulting densities are read and fed into the calculations (equation 2) to find: the change in densities from the known ideal densities the ideal pixel values associated with the new correction, and the change in the ideal pixel values.

This will provide the new ideal densities on the reproduction.

Preferably the densitometer 38 is connected to the processor 30 (computer means) via RS-232 connection. Preferably the reading is automated using a special purpose scanning densitometer. This will allow, in this example, a simple and quick improvement of the photographic system. All that is required is to read the 11 steps of the reproduced test pattern 37 with the connected densitometer 38 and the system calibrates itself.

To allow even the end-points to be modified when necessary (Dmax and Dmin which are also modified by the changes in the processor characteristics) the camera is calibrated so that the required Dmax will be reached, for example, for pixel value of 25 (instead of zero) and the Dmin will be reached at pixel value of 225 (instead of 255) allows automatic changes in the highest and lowest density values. In this case the only additions to the graphs or calculations are the extrapolation values of the curves beyond the existing highest and lowest pixel values.

Modifications

Modifications, some of which are suggested below, may be made in the present invention within the scope of the subjoined claims.

The embodiment described above uses a digital computer and image frame memory to correct the luminance on the screen 22 of the electronic camera. Alternatively, an analog computer system may be utilized or an analog or digital system may be used in which each pixel is compensated as that pixel is being activated.

An absolute luminance reproduction, as well as the relative luminance reproduction described above, may be obtained as follows: (i) the light output of the reproduction is controlled, for example, in the case of film reproduction the intensity of the light and (ii) the linear tone reproduction curve is maintained at 45°, see FIGS. 2, 4 and 6.

Such absolute tone reproduction is not always required. If a linear relationship is required, but absolute tone reproduction is not required, the tone reproduction curve is straight, but its angle need not be 45°. For example, the 45° line in FIGS. 2, 4 and 6 may be changed to a straight line at 60° to provide a hard copy reproduction with higher contrast and with linear tone reproduction, i.e., linear relationship between tones.

Figure 4:
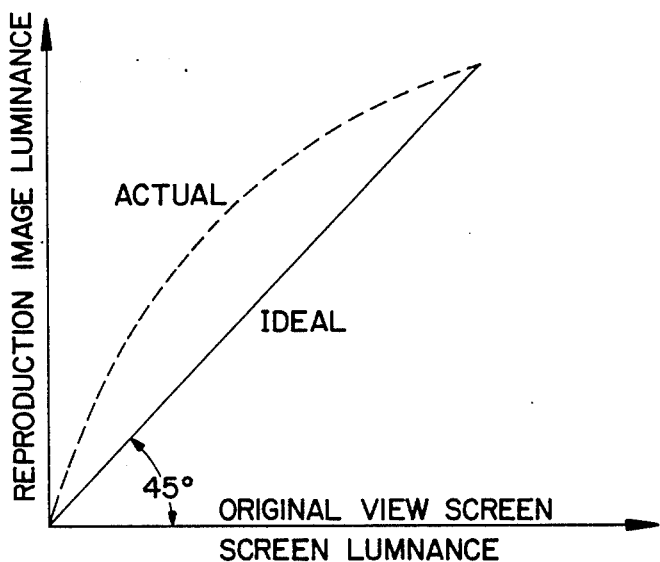
FIG. 4 is an X-Y graph in which the reproduction image (luminance) (Y axis) is plotted against screen luminance (X axis)

In those cases in which a distorted tone reproduction is required, i.e., non-linear and/or non-absolute, the desired distorted curve may be entered on FIGS. 2, 4 and 6 in place of the ideal curves. The correction in densities to obtain the distorted curve may be obtained and their values entered into the look-up table 32.

As mentioned above, the present invention is applicable to improve the accuracy of reproduction of color images. For example, in a graphic arts color system a spectrometer measures the values of hue, chroma and brightness of a color test pattern on the original screen; for example, the original screen may be a color video screen of an electronic camera. The output of the spectrometer is converted, if necessary, to digital form and entered into a separate look-up table in the video processor to provide the original screen values of red, green and blue (R, G, B) for each pixel. A hard copy, for example, color film transparency, is made of the test pattern on the original screen and the color of the film test pattern is measured, for example, using the same spectrometer or using a color densitometer. The color corrections are entered into the color look-up table using the method described above in connection with tone. The original screen is then corrected, on a pixel-by-pixel basis, using the corrections from the color look-up table. Preferably both tone and color are corrected to produce accurate color reproductions.

The term "original screen", as used herein, in the abovedescribed embodiment refers to the screen of the video monitor 20. The screen 22 of the electronic camera is corrected to produce the accurate image reproduction. In the soft-copy system, in which one video screen is corrected to match another video screen, one video monitor is connected to the video processor and its screen ("reproduced screen") is corrected on a pixel-by-pixel basis to match the image on another video monitor, so that viewers see the same gray scale and/or color on both monitors.

In the embodiment described above, the screen was divided into one million pixels. However, the number of pixels is at least 100,000 and may be as many as five million.

The present invention may also be used to correct for distortions in the CRT tube. For example, some areas of the CRT tube screen may be manufactured with insufficient phosphors and consequently those areas have less luminance than the remainder of the screen. Such screen distortions may be compensated as follows: (i) a test image, preferably a uniformly gray image of a single tone, is shown on the video screen which is to be corrected, (ii) a photograph is made of the test image on that screen and the film is carefully developed, (iii) a densitometer having a small view area is moved over the developed film to produce a density value at each pixel, (iv) the pixel-by-pixel density values are entered into the computer (video processor 30), (v) any area (adjacent group of pixels) whose density values vary a predetermined percentage, i.e., 10%, from the standard (the mean density values of the photograph) are entered, by corresponding screen pixel location, into a separate computer memory screen distortion compensation look-up table, along with the compensating values for those pixels of the deviant area, and (vi) the video screen is compensated on a pixel-by-pixel basis, using the screen distortion look-up table for each video frame.

What is claimed is:

1. The method of producing a series of photographs from black-white electronic camera video screen images which are accurate tone reproductions of the luminance ratios of the video images on a separate video monitor screen, including the steps of:

forming a gray scale test video image on the screen of the video monitor, measuring the luminances in the gray scale of the test image on the monitor screen using a photometer to provide a set of monitor screen gray scale luminance values, and entering the set of monitor screen gray scale luminance values into a computer;

forming a gray scale camera test video image on the video screen of an electronic camera, said camera including said camera video screen and electronic means to vary the video signals to control the luminance values on said camera video screen on a pixel-by-pixel basis, the camera test video image having a predetermined tone scale including defined areas differing in luminance ratios;

photographing said camera test video image to produce a latent image of said camera test video image using the same batch of black-white photosensitive film as will be thereafter used to photograph the camera video screen; developing the latent image of the film to produce a film test image using the same developing chemicals and conditions as will be thereafter used for developing the batch of film; density sensing the density differences in the gray scale on the developed film test image using a photoelectric densitometer and entering the sensed density differences values into the computer, comparing said entered film density differences values with the set of monitor gray scale luminance values stored in computer memory; using the computer to automatically produce a set of corrections to said video signals for each luminance value for each pixel of said camera video screen based on the said comparison, and altering the tones on the camera video screen according to said set of computer produced corrections using the electronic means of said camera video device.

2. A method as in claim 1 wherein the series of photographs are black-white film negatives and the densitometer measures light transmitted through the test image on the film.

3. The method as in claim 1 wherein the series of photographs and the developed images are prints and the densitometer measures light reflected from the test image on the print.

4. The method as in claim 1 wherein the densitometer produces electrical signals and is connected as an electrical signal input to said computer so that the densitometer signal output is automatically entered into said computer.

5. The method as in claim 1 wherein the test camera video image, set of corrections and altering the setting of the electronic means is done on a daily basis when the series of photographs are being produced.

6. The method as in claim 1 and including the step of showing a video image on the monitor screen substantially simultaneously with showing said video image on said electronic camera screen.

7. The method of producing a series of reproduction hard-copy images which are accurate tone reproductions of the luminance ratios of the video images on the screen of a video monitor, including the steps of:
   forming a gray scale test video image on the screen of the video monitor, sensing the luminance differences in the gray scale of the test image on the monitor screen using a photometer to provide a set of monitor screen gray scale luminance values, and entering the set of monitor screen gray scale luminance values into the computer memory of a computer;
   forming a gray scale test video hard copy image using a hard copy image producing video device separate from the video monitor and having electronic means to vary the luminance values produced on the hard copy by said video device on a pixel-by-pixel basis, the device test image having a predetermined tone scale including defined areas differing in luminance ratios;
   sensing the densities in the gray scale on the reproduced device hard copy test image using a photoelectric densitometer and entering the sensed density values into the computer, comparing said entered density values with the set of monitor gray scale luminance values stored in computer memory; using the computer to automatically produce a set of corrections based on said comparison for each luminance value for each pixel of said video device; and altering the tones produced by the video device according to said set of computer produced corrections by altering the settings of the electronic means of said video device.

8. The method of claim 7 wherein said hard copy is photosensitive material and said reproduction is by direct laser light beam acting on said photosensitive material.

9. A system for producing a series of photographs from video screen images of an electronic camera which are accurate tone reproductions of the luminance ratios of the video images on a separate video monitor including:
   an electronic camera having a camera video screen displaying on a pixel-by-pixel basis a video image having varied luminance ratios; means for forming a gray scale test video image on said camera video screen, the test image having a predetermined tone scale including defined areas differing in luminance ratios, electronic means to vary the luminance ratios on the camera video screen on a pixel-by-pixel basis;
   camera means for photographing said camera video test image to produce a latent image of said camera video test image using the same batch of black-white photosensitive film as will thereafter be used to photograph the camera video screen;
   photoelectric densitometer means for sensing the density differences in the gray scale on the film test image after it has been developed to produce a set of densitometer difference values;
   a video monitor separate from said electronic camera video screen and having a monitor video screen, means for forming a gray scale monitor video test pattern on the monitor screen, photometer means for luminance sensing the luminance differences in the gray scale of the test pattern on the monitor screen and for providing a set of monitor screen gray scale luminance values;
   computer means connected to said densitometer means and said photometer means and including means for entering the set of monitor screen gray scale luminance values; computer memory means for storing the photometer sensed luminance values, calculation means for comparing said densitometer density difference values with the set of photometer difference values stored in computer memory to produce a set of correction values; and
   computer control signal means connected to said computer means for automatically producing a correction luminance value for each pixel of said camera video screen, said control signal means being connected to said electronic camera electronic means for altering the luminance of each pixel according to said correction luminance value.

10. A system as in claim 9 wherein the series of photographs are black-white film negatives and the densitometer measures light transmitted through the test image on the film.

11. A system as in claim 9 wherein said computer memory includes a look-up table memory for said correction values.

12. A system as in claim 11 wherein said computer memory includes a video frame memory to store the luminance value of each pixel of a video frame.

13. A system for producing a series of hard copy reproductions of a series of video screen images appearing on a video monitor, the reproductions being accurate tone reproductions of the luminance ratios of video images on said video monitor, said system including:
   a video monitor having a CRT screen to display video images:
   a video device hard copy reproduction means to produce hard copy reproductions of video images, said reproduction means including electronic means to vary the apparent blackness of the hard copy on a dot-by-dot basis;
   means to produce a test pattern of luminance ratios as a video image on said monitor CRT screen and means to produce a test pattern of luminance ratios reproduced as hard copy by said reproduction means;
   photometer means to provide a set of monitor screen gray scale luminance values;
   an electronic densitometer and a computer means connected to said densitometer and said photometer means; said computer means being connected to said reproduction means and controlling said electronic means;
   said densitometer measuring the tones of the hard copy test pattern as represented by the densities thereon and producing a set of signals corresponding to the density differences thereon;
   said computer means including a computer memory having a look-up table including a set of numerical values representing the density values for each tone, said computer means including calculation means to automatically produce from said look-up table a correction value for each density value at each dot based on the difference between the value of each tone measured by the densitometer and the monitor screen gray scale luminance value for each tone; and control means to control said electronic means at each dot according to said correction values.

14. A system as in claim 13 wherein said computer means includes a frame memory which stores at least one complete image in digital form with each pixel corresponding to each dot on a one-to-one relationship.

15. A system as in claim 13 wherein said hard copy is photo-sensitive film, said reproduction means is a laser beam film printer which forms a latent image on said film.

16. A system as in claims 9 or 13 and further including light means to view the photographs and reproductions and adjustable means to adjust the luminance of the light means to match the luminance of the monitor screen in order to obtain absolute luminance reproduction.

17. A method as in claims 1 and 7 and including the step of viewing the series of photographs after adjusting the light with which they are viewed to match the luminance of the monitor screen in order to obtain absolute luminance reproduction.

* * * * *